Aug. 15, 1933.  C. A. KNUUTILA  1,922,165
FLOWER PICK
Filed Dec. 8, 1931
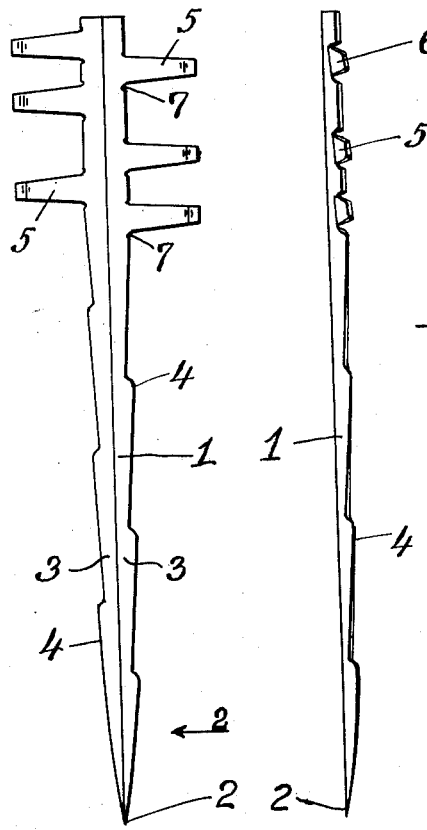

Patented Aug. 15, 1933

1,922,165

UNITED STATES PATENT OFFICE 1,922,165

FLOWER PICK

Charles A. Knuutila, Newark, N. J.

Application December 8, 1931. Serial No. 579,698

6 Claims. (Cl. 47—55)

The object of this invention is to provide an improved metal flower pick adapted to be attached to the stem of a flower by means of a machine whereby to create an entirely new mode of stemming flowers quickly and economically and in a manner which to my knowledge has never heretofore been attempted or which at least is not in use within the industry.

I refer here to flower picks which are cut or stamped from very thin sheet metal selected with special care for the purpose. The pick is formed with a longitudinal body or stem, pointed at one end and provided at the other end with laterally extending short fingers or prongs adapted to be wrapped around the stem of the flower and thus secure the two articles together.

Metal flower picks of the type described are known to the art but are not adapted nor have they been designed for machine operation. Florists everywhere therefore, use wooden sticks, thin and a few inches long which are secured to the stems of the flowers by thin wires. The wooden sticks with the wire attached are manufactured and sold in enormous quantities. They are attached to the flower stems by manual operation and their use is tedious, wasteful, takes time and the operators often cut or prick their fingers on the wire.

My invention is embodied in a flower stemming device as a new article of manufacture made from sheet metal and comprising a picklike body, pointed at one end and provided at the other end with suitable bent or curved fingers or projections adapted to be wrapped around the flower stem. The body or stem of the pick is also provided at the edges with shoulders or burs to prevent the pick from falling out once it has been inserted in place.

It is also a characteristic feature of my flower pick that it is specially designed and formed so as to be operated upon and attached to the flower stem by an automatic machine.

My invention is therefore embodied in a flower pick or flower stemming device embodying and comprising the features of construction and arrangement as hereinafter described and as illustrated in the accompanying drawing in which Fig. 1 is a face view of my improved flower pick looking in the direction of the arrow 1 in Figure 3.

Fig. 2 is a side view thereof looking in the direction of the arrow 2 in Figure 1.

Fig. 3 is a top end view.

Referring to Figures 1, 2 and 3 my improved flower pick is cut from sheet metal in the form of a blank comprising a stem 1 having a pointed end 2. The stem is grooved or V-shaped in cross section providing two angularly disposed sides 3, 3 having stepped edges 4, 4. The upper end of the stem is provided with fingers 5, 5 spaced in relatively close staggered relation as shown. The tips 6 of the fingers are curved upwardly and lie in a higher plane than the body of the pick as seen in Figure 3 to facilitate the curling or wrapping of the fingers around the flower stem. In addition the pick may be provided with nicks or notches 7 at the base of the fingers to enable the latter to be bent or wrapped closely around even thin flower stems. The fingers 5 may be slightly twisted or tilted with relation to the stem to facilitate the stacking of the picks in a machine and the feed of the lowermost pick from under a pile of picks. The rear raised edges of the fingers also contribute to a more positive and sure feeding operation. The V-groove formation of the pick stem adds rigidity, yet permits the stem to be bent or adjusted for the desired position of the flower. The stepped edges of the stem prevent withdrawal or accidental falling out of the stemmed flower from the moss or base of a wreath or other floral piece. This is of importance in cases where floral pieces are made up and stored so that the moss dries.

In operation the picks will preferably be assembled in stacks closely nested for automatic operation in a suitable machine. One of the picks will be automatically removed from the stack and placed in a position to receive the flower stem so that the fingers of the pick may be wrapped around the flower stem by some suitable mechanism which is a part of the machine referred to. Inasmuch as a machine for attaching the flower pick may be embodied in several forms of construction and arrangement, no particular illustration or description of such a machine is given herein.

However the flower pick embodying the present invention is in actual use and is being actually attached to flower picks by means of a machine. The distiguishing features of the flower pick such as the construction and arrangement of the attaching fingers as well as the relative proportions of the several parts of the pick make it peculiarly well adapted for successful adoption in the art.

I claim:—

1. A flower pick of the character described formed from an integral metal blank comprising a relatively long stem portion having its one end pointed and provided at and near its opposite end on both sides thereof with a plurality of fingers tapering outwardly from said stem, the said fingers being spaced relatively close to each other, the fingers on one side of the stem being staggered with respect to the fingers on the opposite side of the stem, the points of said fingers being slightly curved.

2. A flower pick of the character described formed from an integral metal blank comprising a relatively long stem portion of V-shaped cross section having a pointed end and provided at and near its opposite end with a plurality of closely spaced tapered fingers on each side having curved free ends and extending to both sides of said stem portion in opposite regularly staggered relation.

3. A flower pick of the character described formed from an integral metal blank comprising a stem portion having a pointed end and provided adjacent the opposite end with a plurality of closely spaced fingers extending on each side of the stem in spaced staggered relation, whereby when said pick is attached to a flower stem, the said fingers are adapted to be folded around the flower stem in opposite direction, a finger on one side of the pick stem lying close to and between two fingers on the opposite side of the pick stem.

4. A flower pick of the character described formed from an integral metal blank comprising a stem portion of V-shaped cross section having a pointed end and provided at its opposite end with tapered fingers extending to both sides of the stem in closely spaced staggered relation, the edges of the said stem being stepped and the ends of the said fingers being curved for the purposes set forth.

5. A flower pick of the character described formed from an integral metal blank comprising a stem portion having one end pointed and provided at its other end with a plurality of spaced fingers extending to both sides of the stem portion in relative closely staggered relation, said fingers being angularly disposed with relation to the longitudinal axis of the said flower pick.

6. A flower pick of the character described formed from an integral metal blank comprising a stem portion having one end pointed and provided at its other end with a plurality of spaced fingers extending to both sides of the stem portion in relative staggered relation, said fingers being angularly disposed with relation to the longitudinal axis of the said flower pick, the edges of said stem portion being formed with shoulders or steps to prevent accidental withdrawal of the said flower pick.

CHARLES A. KNUUTILA.